US010956981B1

(12) United States Patent
Fields et al.

(10) Patent No.: US 10,956,981 B1
(45) Date of Patent: *Mar. 23, 2021

(54) SYSTEMS AND METHODS FOR VISUALIZING AN ACCIDENT SCENE

(71) Applicant: STATE FARM MUTUAL AUTOMOBILE INSURANCE COMPANY, Bloomington, IL (US)

(72) Inventors: Brian Mark Fields, Normal, IL (US); Lee Marvin John Assam, El Paso, TX (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 608 days.

This patent is subject to a terminal disclaimer.

(21) Appl. No.: 15/482,061

(22) Filed: Apr. 7, 2017

(51) Int. Cl.
*G06Q 40/08* (2012.01)
*G06T 19/20* (2011.01)
*G06T 19/00* (2011.01)
*H04N 5/232* (2006.01)

(52) U.S. Cl.
CPC .......... *G06Q 40/08* (2013.01); *G06T 19/006* (2013.01); *G06T 19/20* (2013.01); *H04N 5/23238* (2013.01); *G06T 2219/004* (2013.01)

(58) Field of Classification Search
USPC .......................................................... 705/4
See application file for complete search history.

(56) References Cited

U.S. PATENT DOCUMENTS

| 9,412,203 | B1 | 8/2016 | Garcia, III et al. |
| 9,503,681 | B1 | 11/2016 | Popescu et al. |
| 2003/0046003 | A1* | 3/2003 | Smith ............... G07C 5/085 701/32.2 |
| 2009/0271715 | A1 | 10/2009 | Tumuluri |
| 2013/0073619 | A1 | 3/2013 | Tumuluri |
| 2016/0358383 | A1 | 12/2016 | Gauglitz et al. |
| 2017/0053621 | A1* | 2/2017 | Chen ................. G06F 3/1454 |
| 2017/0293894 | A1* | 10/2017 | Taliwal ............. G06K 9/6201 |
| 2019/0116314 | A1* | 4/2019 | Tran ................. H04N 13/194 |
| 2019/0130193 | A1* | 5/2019 | Leppanen ........... H04N 5/445 |

OTHER PUBLICATIONS

What to Do After a Car Accident: Checklist & Tips for Drivers by Joshua Taylor, WalletHub Editorial Team • Apr. 19, 2015 https://wallethub.com/edu/ci/after-car-accident/12090/ (Year: 2015).*

(Continued)

*Primary Examiner* — Hani M Kazimi
*Assistant Examiner* — Hatem M Ali
(74) *Attorney, Agent, or Firm* — Lee & Hayes, P.C.

(57) ABSTRACT

Systems and methods are disclosed for annotating and visualizing a damage scene. In various aspects, one or more immersive multimedia images are generated and associated with a damage scene. The immersive multimedia image(s) may be augmented with annotation(s) to create annotated immersive multimedia image(s). The annotated immersive multimedia image(s) may be visualized using a using a virtual reality (VR) device, where the damage scene and the annotation(s) of the annotated immersive multimedia image(s) can be viewed via the VR device.

20 Claims, 7 Drawing Sheets

(56) References Cited

OTHER PUBLICATIONS

How to Determine the Extent of a Car Accident's Damages and Injuries by Bobbie Sage updated Mar. 15, 2019 https://www.thebalance.com/determine-damages-in-car-accident-2645568 (Year: 2019).*

Auto Insurance Claims: Step-By-Step Guide & Advice by Joshua Taylor, WalletHub Editorial Team • May 15, 2015 https://wallethub.com/edu/ci/car-insurance-claims/12882/ (Year: 2015).*

Non Final Office Action dated May 8, 2020 for U.S. Appl. No. 16/457,011 "Systems and Methods for Enhancing and Developing Accident Scene Visualizations" Fields, 11 pages.

\* cited by examiner

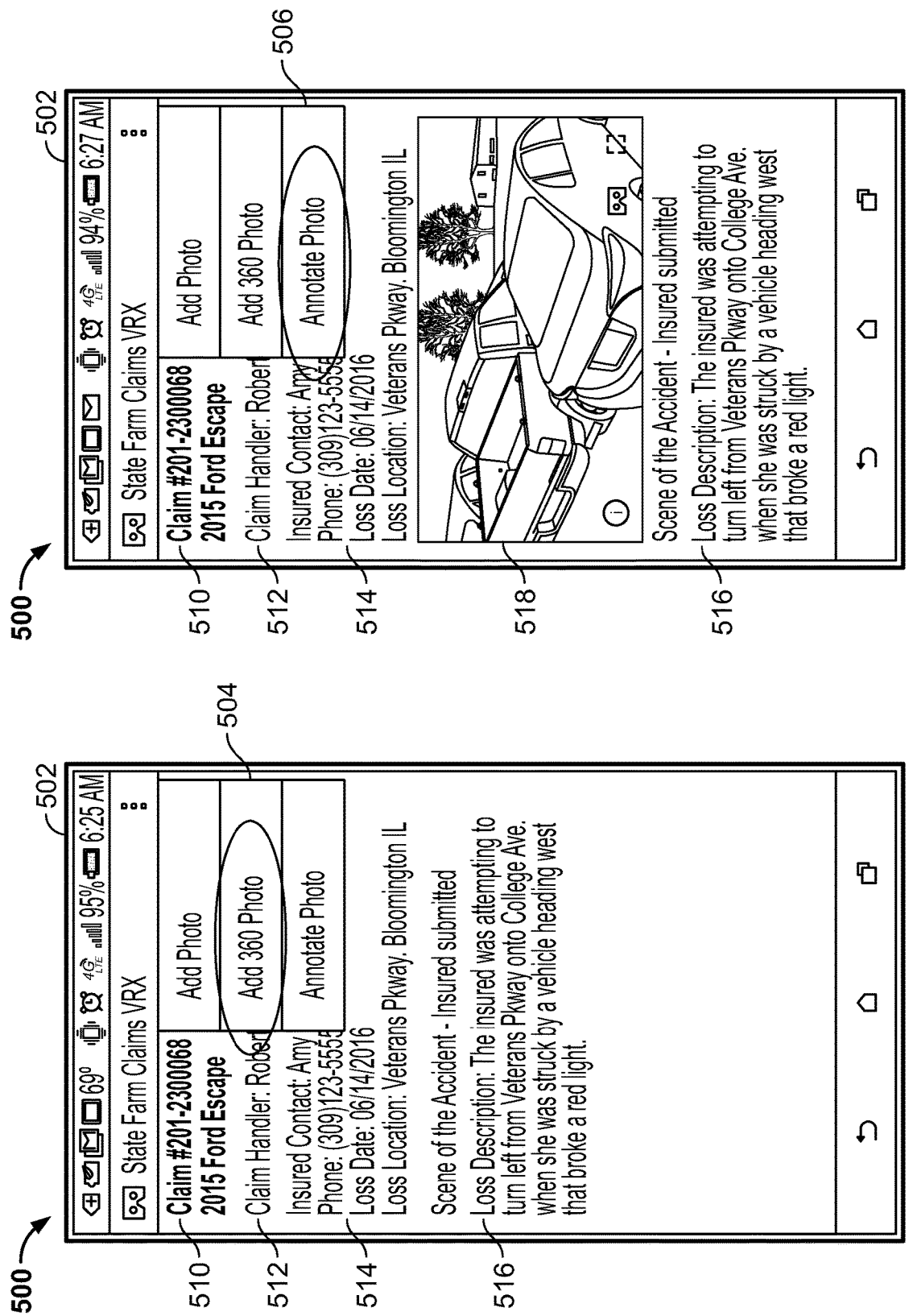

SYSTEMS AND METHODS FOR VISUALIZING AN ACCIDENT SCENE

FIELD OF THE DISCLOSURE

The present disclosure generally relates to augmenting immersive multimedia images to create annotated immersive multimedia images for virtual reality (VR) visualization purposes, and, relates in particular to augmenting immersive multimedia images to create annotated immersive multimedia images in order to visualize a damage scene in virtual reality.

BACKGROUND

The traditional description of damage events typically relies on witness statements, and, in some instances, two dimensional (2D) pictures, used to describe the location, scene, time, and/or individuals or things involved in the damage event. Damage events can relate to a moving or parked automobile accident, a household fire, a household water damage event, or any other damage event, which each typically include damaged items, such as a damaged vehicle or damaged home. Damage events can include damage scenes and damaged items, including an automobile accident that occurred at an intersection resulting in damaged vehicles, or a house fire that occurred at a home owner's household resulting in a damaged room or room(s). Typically, such events happen suddenly, and in some cases, with few or no witnesses, such as a water damage event in a household basement.

Accordingly, a problem arises during the aftermath of such events, where witness statements, or two dimensional (2D) pictures taken at different times, such as before, during or after the event, do not coincide or are otherwise inconsistent to provide a holistic understanding of the damages event. Such inconsistent witness statements or pictures can make it difficult to understand the timing, scenery, facts, or other circumstances that caused the accident or describe or show how the item was damaged. For example, this can create issues for companies or individuals involved in remedial or other post-damage event services, such as insurance companies or repair services, in determining the cause of damage or otherwise determining or recreating the scene or environment when or at what location the related damage event occurred.

BRIEF SUMMARY

Accordingly, systems and methods are needed in order to annotate and visualize damages scenes with additional data or information in order to more accurately portray the environment at the time of damage (or times just before or after the time of damage). In various embodiments disclosed herein, virtual reality (VR) visualizations can be used to visualize a damages scene. The VR visualization can include annotations, including graphics, text, video, or other information that can be used to more accurately describe the timing, characteristics or other circumstances related to the damage event or one or more damaged items associated with the damage scene or damage event. The VR visualizations can allow individuals, such as an individual associated with remedial or other post-damage event services, for example, an insurance claims adjuster or other insurance representative, to visualize a damage scene that may be augmented with annotations or other information via multiple point-of-view perspectives to recreate the actual scene at the time of damage event. In some embodiments, the VR visualizations may be used to create a real-time simulation video of an accident, such an automobile crash. Accordingly, various embodiments herein allow an individual, including individuals who were not present during the damage event, to visualize and determine the damage scene from a witness perspective. In various embodiments, the visualizations can allow an individual to visualize where a witness was located during the event so as to determine what the witness would have been able to see in the damages scene at the time of the damage event.

In various embodiments disclosed herein, the visualization systems and methods also provide benefits to an individual associated with a damaged item, such as the owner of a damaged vehicle or damaged household, or a claims adjuster or other insurance representative associated with an insurance claim filed for a damaged item. In some embodiments, the owner may be a customer or policy holder associated with an insurance company. In such embodiments, the visualization systems and methods can enable the owner, customer, insurance representative, or other individual to generate or capture immersive multimedia images associated with a damages scene by taking one or more immersive multimedia images with a computing device at the location of the damages scene. In some aspects, the immersive multimedia images may then be augmented with one or more annotations to associate additional information with the damage event or scene. In various embodiments, the augmented immersive multimedia images may then be analyzed, inspected, viewed, further annotated or otherwise manipulated by other individuals to further enhance or more accurately represent the damage scene. In some embodiments, the immersive multimedia images, augmented or otherwise, may be visualized in a virtual reality device for analysis, inspection, viewing, further annotation or other manipulation.

In some embodiments, for example, the augmented immersive multimedia images may be used to determine an outcome associated with the damage scene or event. For example, in certain embodiments, the augmented immersive multimedia images may be used to visualize the damage scene where an insurance claims adjuster, or other insurance representative, may adjust or otherwise determine a damage amount associated with an insurance claim related to the damage event or damage scene. In such embodiments, for example, the immersive multimedia images may be submitted by the owner as part of an insurance claims filing process.

In various embodiments, systems and methods are described herein for annotating and visualizing a damage scene. The systems and methods may use one or more processors to generate immersive multimedia image(s), where the one or more immersive multimedia images can be associated with a damage scene, such as a damages scene related to a vehicle accident or a property damage event. The immersive multimedia image(s) may include 360-degree photographs, panoramic photographs, 360-degree videos, panoramic videos, or one or more photographs or videos for creating an immersive multimedia image.

In some embodiments, the immersive multimedia image(s) may be augmented with annotation(s) to create respective annotated immersive multimedia image(s). In various embodiments, the annotation(s) can include any of a text-based annotation, a voice-based annotation, a graphical annotation, a video-based annotation, an augmented reality annotation, or a mixed reality annotation. For example, the damages scene may be annotated with an augmented reality annotation or a mixed reality annotation that describes the damages scene at or near a time when the related damage event occurred in order to enhance the damage scene for visualization purposes as described herein. In some embodiments, the annotated immersive multimedia image(s) may be annotated with metadata, which, for example, can include weather or GPS information associated with the damage scene at the time of the damage event. In some embodiments, a user can select from a display listing of preexisting annotations that may be used to augment immersive multimedia images to create annotated immersive multimedia images.

In some embodiments, the annotated immersive multimedia image(s) may be visualized using a virtual reality (VR) device, where the damage scene and the annotation(s) of the annotated immersive multimedia image(s) can be viewed via the VR device.

In other embodiments, the damage scene of an immersive multimedia image can depict a damaged item having a point of impact annotation associated with the damaged item. In the example embodiment, a prior image of the damaged item can be overlaid on or displayed together with at the immersive multimedia image in order to show the extent of damage of the damaged item, for example, how the item looked before it was damaged and how it looked after it was damaged.

In other embodiments, a simulation video may be created of the damage scene based on a plurality of immersive multimedia image(s). In other embodiments, the generation of immersive multimedia image(s) can occur at or near the damage scene, but the visualization of the immersive multimedia image(s) can occur at a location remote to the damage scene using a virtual reality (VR) device.

In various embodiments, systems and methods are described herein for enhancing and developing a damage scene visualization. The systems and methods may use one or more processors to receive annotated immersive multimedia image(s) from a first user. In some embodiments, the annotated immersive multimedia image(s) can be associated with a damage scene.

In some embodiments, a VR visualization of the annotated immersive multimedia image(s) may be rendered using a VR device associated with a second user, such as a claims adjuster or insurance claims trainee of an insurance provider, or a remedial or repair services representative of a repair or remedial company associated with repairing damaged items related to the damage scene. In some embodiments, the second user may enhance the annotated immersive multimedia image(s) provided by the first user, where the annotated immersive multimedia image(s) provided by the first user are augmented by the second user with additional annotation(s). In some embodiments, the additional annotation(s) can be transmitted from the first user via a computer network to the second user. In some embodiments, each of the annotated immersive multimedia images can include timestamp value(s) that can indicate when the annotated immersive multimedia image(s) were generated, received, stored, etc.

In one example embodiment, the enhanced immersive multimedia image can be a mixed reality immersive multimedia image, where an annotation, such as a graphical annotation, is used to generate the mixed reality immersive multimedia image by augmenting the annotated immersive multimedia image(s) of the first user with the graphical annotation.

In some embodiments, a selectable list of annotation(s) may be provided to the first user, where selection of a particular annotation from the list of annotation(s) by the first user causes the enhanced immersive multimedia image to be augmented with the particular annotation.

In some embodiments, a verification indication may be received from the first user, where the verification indication indicates that the enhanced immersive multimedia image represents an interpretation of the damage scene as determined by the first user.

In other embodiments, the first user and the second user may simultaneously visualize the enhanced immersive multimedia image on respective first and second VR devices. In some embodiments, the first user and the second user may be at remote locations.

In some embodiments, the VR visualization may be used to determine a damage amount, where the damage amount is determined from one or more damaged items identifiable in the annotated immersive multimedia images. In some embodiments, the damaged items identifiable in the VR visualization can have a predetermined value. In various aspects, the predetermined values of multiple damaged items may be used to calculate the damage amount. In some embodiments, the damage amount may be modified, for example, by a claims adjuster of an insurance company associated with a damages claim.

In some embodiments, the annotated immersive multimedia images from the first user may be stored by a computing device at an initial time and may be accessed to render a VR visualization at a later time.

In some embodiments, the augmented immersive multimedia images of the first user are capable of being displayed on a web browser as corresponding two dimensional (2D) image(s) via an online application.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 5A illustrates an exemplary user interface of a computing device for associating an immersive multimedia image with a damages scene.

FIG. 5B illustrates the exemplary user interface of the computing device of FIG. 5A depicting an immersive multimedia image associated with a damages scene.

The Figures depict preferred embodiments for purposes of illustration only. Alternative embodiments of the systems and methods illustrated herein may be employed without departing from the principles of the invention described herein.

DETAILED DESCRIPTION

Figure 1:
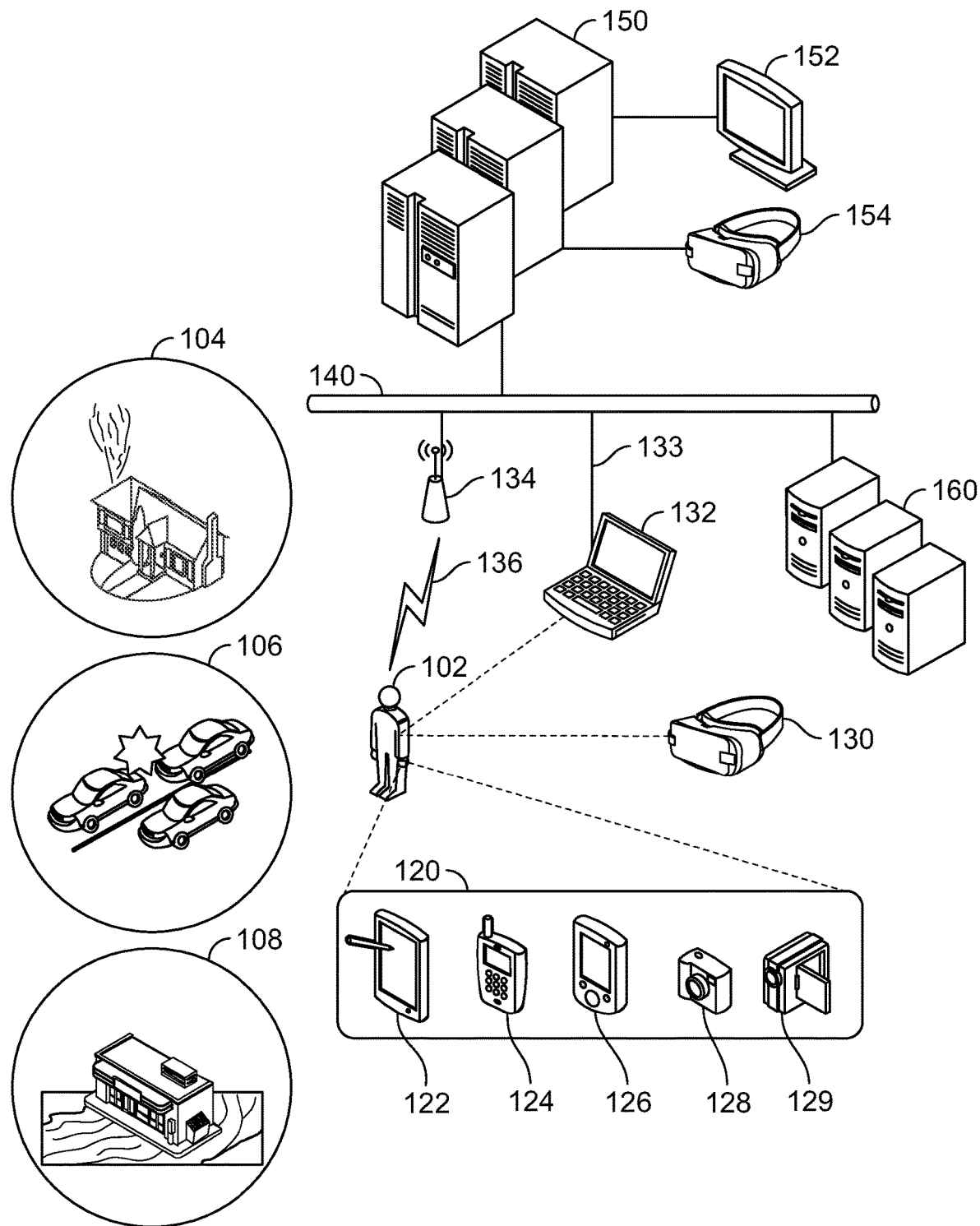
FIG. 1 illustrates an exemplary network diagram in accordance with various embodiments of the present disclosure.

FIG. 1 illustrates an exemplary network diagram in accordance with various embodiments of the present disclosure. Each of damage scenes 104, 106, and 108 is representative of an example damage scene that is associated with an example damaged item and an example damage event. In one example embodiment, damage scene 104 depicts a damaged home or household that was damaged by a fire event. In another example embodiment, damage scene 106 depicts one or more damaged automobiles or vehicles that were damaged in an automobile accident event. In a further example embodiment, damage scene 108 depicts a damaged home, household, or commercial property that experienced a water damage event. It is to be understood that although only automobile, fire, and water damage scenes, damage events, and related damaged items are depicted and described for FIG. 1, the example disclosure herein can also relate to numerous other damage events, damage scenes, and damaged items that are applicable to the disclosed systems and methods herein.

In various embodiments, each of the damage events could have occurred at the respective damage scene locations, such as damage scenes 104-108, and at particular times, and may have one or more witnesses to the damage event. In some embodiments, witnesses can include, for example, individuals involved in the damage event, such as an operator or passenger of an automobile or vehicle that was damaged in an automobile accident event, or a home owner, resident, occupant, visitor, customer, or other individual that witnessed a property related fire, water or other property damage event. In other embodiments, witnesses can also include individuals who were not directly involved in the damage event, but that otherwise witnessed the damage event or that were in the vicinity of the damage scene when it occurred.

In various embodiments, person 102, which may be representative of witnesses or other individuals at or near the damages scene, can capture immersive multimedia images with a computing device, such as with any of computing devices 120. The computing devices 120 can include a camera, photographic lens, and/or sensor for taking immersive multimedia images. Computing devices 120 can include, for example, tablet device 122, mobile phone 124, smart phone 126, camera device 128, and/or video recorder 129. Each of the computing devices 120 can include one or more processors, one or more computer memories, one or more cameras or imagining sensors for capturing or generating immersive multimedia images. The computing devices 120 may also include software or instructions for capturing, generating, annotating, augmenting, transmitting, interacting with, or otherwise manipulating the immersive multimedia images.

In various embodiments, immersive multimedia images can include 360-degree or panoramic photographs, and/or 360-degree or panoramic videos. For example, a 360-degree photograph or video can be captured using any of computing devices 120 capable of capturing a full 360-degree view of a scene, a location or an object, such as any of damage scenes 104-108. In one example, a user, such as person 102, may activate a computing device 120 and rotate 360-degrees to capture a 360-degree immersive multimedia image of a scene, for example, any of damage scenes 104-108, from the user's vantage point. In another example, a panoramic photograph or video may be captured using any of computing device 120 cable of capturing a panoramic photograph or video, which may be less than a full 360-degree view of a scene, a location or an object.

In other embodiments, one or more photographs or videos, as captured from a computing device 120, can be used to create an immersive multimedia image. For example, in one embodiment, several photographs and/or videos that were not captured as 360-degree or panoramic images can be positioned together such that the several photographs and/or videos create a complete 360-degree or panoramic photograph and/or video image. The completed 360-degree or panoramic image can represent, and essentially recreate, a scene or view that was not originally captured as a 360-degree or panoramic image. The completed 360-degree or panoramic image can then be used as, or used to create, an immersive multimedia image as described herein.

In various embodiments, the immersive multimedia images may be saved in one or more memories of a computing device 120. For example, in some embodiments, the immersive multimedia images or videos may be saved in various image or video file formats, such as Joint Photographic Experts Group (JPEG), Portable Network Graphics (PNG), Tagged Image File Format (TIFF), bitmap (BMP), Moving Picture Experts Group (MPEG), or QuickTime (MOV).

In various embodiments, the computing devices 120, may have input controls, such as physical buttons located on the device itself, or graphical touchscreen inputs on the screens or user interfaces of the respective devices, for example, the screens or user interface of the smart phone 126. The input controls allow a user, such as person 102, to provide commands to the computing devices, such as when and how many immersive multimedia images to capture. The input controls may also allow the user to input data or select options from menus, lists, selectable graphics, or other items as displayed on a user interface screen of the computing device. For example, as disclosed in various embodiments herein, the input controls, input commands, or selectable menu items of a device 120 can allow the user to augment one or more immersive multimedia images with annotations, including any of a text-based annotation, a voice-based annotation, a graphical annotation, a video-based annotation, an augmented reality annotation, and/or a mixed reality annotation. In some embodiments, the augmentation information may be saved with an immersive multimedia image file or, in other embodiments, as a separate file or files associated with the immersive multimedia image.

In some embodiments, person 102 can also represent a non-witness. For example, person 102 may be associated with a provider of post-damage event activities or services, such as an insurance representative (e.g., a claims adjuster) of an insurance company that collects information, including immersive multimedia images, for a claim filed by a customer of the insurance company and related to an item that was damaged during the damage event. Other examples can include a representative of remedial service or repair service, such as a fire and water remedial service representative for property related damage, or an auto repair representative for automobile related damage. The non-witnesses can capture immersive multimedia images using the same methods as described above, for example, using computing devices, such as computing devices 120, to capture immersive multimedia images of the damage scene, for example, damage scenes 104-108. It should be understood that the above embodiments are examples and that other non-witnesses are contemplated, including any non-witnesses that may capture immersive multimedia images of a damages scene and that can be used with VR visualization as describe herein. For example, the Google Map service, including the Street View feature, includes immersive multimedia images of various potential damages scenes and locations, such as a street interaction, that may be captured by multiple non-witnesses and that may be used with the systems and methods herein.

In various embodiments as described herein, the immersive multimedia images can be visualized in a virtual reality (VR) device, such as first VR device 130 or second VR device 154. In some embodiments, for example, as depicted for FIG. 4, the VR visualizations can be viewed by a user, such as person 102, via a VR device, such as first VR device 130. In various embodiments, Virtual Reality (VR) can refer to an immersive user experience, where the user can experience the sensation of a three dimensional (3D) environment. For example, in one embodiment, the visualization of immersive multimedia image(s) can be used to create a real-world experience for a user, such as person 102, as if the VR user were actually present at the scene or location that the immersive multimedia images were originally taken. In various embodiments describe herein, the VR images can be visualized with a VR device, such as the first VR device 130 or the second VR device 154, and the user can interact with the VR environment with the VR device. For example, as described herein, in some embodiments, the VR device, such as the first VR device 130 or the second VR device 154, may have several input options, such as buttons or controls associated with the VR device. In other embodiments, the VR device, such as the first VR device 130 or the second VR device 154, may allow input via voice commands or user hand or other body gestures.

A technology related to VR is Augmented Reality (AR). In various embodiments, augmented reality can generally refer to an annotation, overlay, or augmentation of text or media content, such as graphics content, onto real-world immersive multimedia images, such as photographs or video of a real-world damage scene, such as damages scenes 104-108. For example, in some embodiments, augmented reality can include annotating (or supplementing) a real-world immersive multimedia image to include text, voice, graphics, video, GPS data, metadata, or other annotated content. In some embodiments, the annotations can create, or form, augmented reality multimedia immersive images that are capable of being viewed in a VR device, such as first VR device 130 and/or second VR device 154, as further describe herein. In such embodiments, the annotations of the augmented reality multimedia immersive image may be viewed together with a real-world scene in the VR device. In some embodiments, the annotated content may be interactive, where the user of the VR device can select, move, alter, or otherwise interact with the annotated content that appears within a VR visualization as describe herein.

An additional related technology to VR is Mixed Reality (MR). In various embodiments, mixed reality can generally refer to an annotation, overlay, augmentation, or mixing of synthetic content, such as computer generated graphics, virtual scenery, virtual images, or other mixed reality content, with real-world immersive multimedia images, such as real-world photographs or video of a damages scene, such as any of the damage scenes 104-108. In various embodiments, the mixed reality content may appear anchored to or as part of real-world scenery of the immersive multimedia images. In some embodiments, the mixed reality content may be readily discernible as computer generated content to contrast against the real-world immersive multimedia images into which it is embedded. In other embodiments, the mixed reality content may be life-like so as not to be (or to be just barely) discernible from the real-world immersive multimedia images into which it is embedded. In some embodiments, the mixed reality content can create or form mixed reality multimedia immersive image(s) that are capable of being viewed in a VR device, such as first VR device 130 and/or second VR device 154. In such embodiments, the mixed reality content of the mixed reality multimedia immersive image(s) may be viewed together with a real-world scene in the VR device. In some embodiments, the mixed content may be interactive with the real-world content. For example, a user of a VR device, such as first VR device 130 or second VR device 154, may visualize mixed reality content, such as a virtual vehicle, that appears as if it were moving within VR visualization based on one or more real-world immersive multimedia images or other metadata as describe herein. In other embodiments, the mixed reality content may be interactive with the multimedia immersive image(s) in real-time.

In other embodiments, a user, such as person 102, may annotate a multimedia immersive image with mixed reality content using either a computing device 120 or VR device (such as first VR device 130 or second VR device 154) at the same the user captures the multimedia immersive image. In another embodiment, a user may annotate a multimedia immersive image with mixed reality content of an already captured multimedia immersive image, such as when the user is analyzing or reviewing the multimedia immersive image with a computing device or VR device, such as any of computing devices 120, first VR device 130, or second VR device 154.

The VR devices describe herein, such as VR devices 130 and 154, may be any computing device capable of visualizing immersive multimedia images to create a virtual reality experience for the user. In some embodiments, for example, VR devices 130 and 154 may be any commercial VR device, such as a Google Cardboard device, a Google Daydream view device, an Oculus Rift device, a PlayStation VR device, a Samsung Gear VR device, or an HTC Vive device. Each of these VR devices may use one or more processors capable of visualizing immersive multimedia images in virtual reality. For example, the Google Cardboard VR device includes a VR headset that uses one or more processors of an embedded smart phone, such as smart phone 126, which, in some embodiments, can be a Google Android-based or Apple iOS-based smart phone, or other similar computing device, to visualize the immersive multimedia images in virtual reality. Other VR devices, such as the Oculus Rift, may include a VR headset that uses one or more processors of a computing device, such a personal computer/laptop 132, for visualizing immersive multimedia images in virtual reality. The personal computer/laptop 132 may include one or more processors, one or more computer memories, and software or computer instructions for performing the visualizations, annotations, or transmission of immersive multimedia images or VR visualizations as described herein. Still further, other VR devices may include one or more processors as part of a VR headset that can operate independently from the processor(s) of a different computing device for the purpose of visualizing immersive multimedia images in virtual reality. The first VR device 130 may also include software or computer instructions for capturing, generating, annotating, augmenting, transmitting, interacting with, or otherwise manipulating the VR visualizations.

Figure 4:
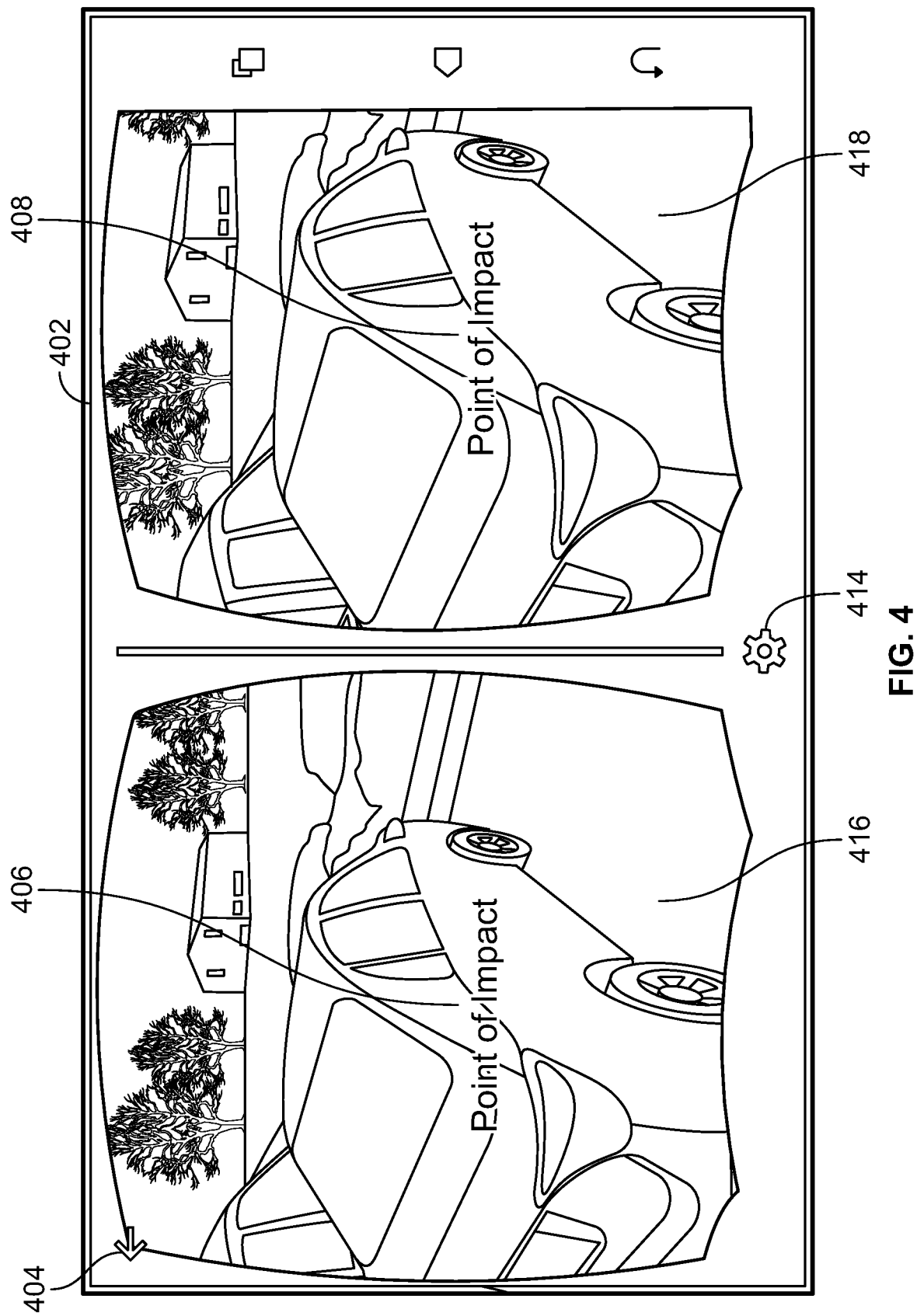
FIG. 4 illustrates an exemplary virtual reality (VR) visualization of the immersive multimedia image of FIG. 2B.

In some embodiments, the headsets of the VR devices, such as the headsets of first VR device 130 or second VR device 154, can include focal distance lenses, such as 40 mm focal distance lenses, to focus a user's vision on a VR visualization, such as the exemplary VR visualization as described for FIG. 4. The distance from the VR headset housing to the screen interface, such as the screen interface of a smart phone 126 in a Google Cardboard headset, as viewed through the focal distance lenses can create a virtual reality experience for the user, such as person 102.

In various embodiments, the VR devices 130 and 154 may include embedded sensors that track a user's head motions and adjust the viewpoint of the VR visualization to simulate a virtual reality environment, giving the user the sensation that the user is looking around within a 3D world. In some embodiments, the embedded sensors may be sensors associated with the mobile device or other computing device that is embedded in the VR headset. In other embodiments, the sensors may be part of the VR device itself.

In various embodiments, first VR device 130 and/or second VR device 154, can include input controls. For example, in some embodiments, the inputs control can be push buttons located on the VR devices 130 and/or 154. In other embodiments, the buttons can include magnets attached to the VR device's housing, where the magnets interact with a computing device embedded in the VR headset, such as a smart phone 126, to cause the computing device to sense (e.g., via a magnetometer located in the computing device) movements of the magnet when pressed, thereby acting as an input source for the VR device. In other embodiments the input controls may include separate joysticks or wired or wireless controllers that a user may manipulate by hand to control the VR device and/or visualizations of the VR device. Still further, in other embodiments, the VR device, or its associated smart phone 126 or personal computer 132, may allow input commands via voice or body gestures to control the VR device and/or visualizations of the VR device.

In various embodiments, the input controls of the VR devices, such as first VR device 130 and second VR device 154, allow a user to interact with the VR visualization, where the user, wearing a VR device, such as first VR device 130 or second VR device 154, can provide input to analyze, review, augment, annotate, or otherwise interact with the VR visualization as described herein. In some embodiments, a user may use the input controls to select from a menu or list displayed within the VR visualization. For example, the displayed menu or list may include options to navigate or highlight certain views or features of the VR visualization. In other embodiments, graphics or items may be interactive or selectable with the VR visualization. Still further, in other embodiments, the user may provide textual, graphical, video or other input to the VR visualization in order to augment, or annotate the VR visualization. In some embodiments, augmentation or annotation of the VR visualization will cause the same augmentation or annotations to appear in the immersive multimedia image(s), upon which the VR visualization is based, and/or vice versa.

In various embodiments, the input controls may be used with a crosshair or other indicator visible to the user within the VR visualization, such that the user hovering the crosshair or other indicator over a menu, list, graphic, text, video, or other item within the visualization can allow the user to interact with item, such as by clicking, pushing, or otherwise selecting the input control to confirm a selection or otherwise manipulate the item that the crosshair or other indicator is focused on.

In various embodiments, the immersive multimedia images and/or VR visualizations may be submitted to a provider, such as an insurance company or remedial services company, via a computer network, such as computer network 140. Computer network 140 may be any computer network, such as the Internet (with or without the use of security protocols, such as Secured Sockets Layer and/or Transport Layer Security), a private network operated by the provider, or a secure virtual private network of the provider operated over the Internet. In some embodiments, a user, such as person 102, may transmit immersive multimedia images and/or VR visualizations directly from a computing device 120, for example, smart phone 126 which may have been used to capture or generate the immersive multimedia images and/or VR visualizations. In other embodiments, the user may first transfer the immersive multimedia images and/or VR visualizations to either the personal computer/laptop 132 or first VR device 130, for example, for augmentation or annotation purposes, and then transmit the immersive multimedia images and/or VR visualizations from the respective devices to the provider via computer network 140.

In some embodiments, the personal computer/laptop 132 may be connected to computer network 140 via a wired connection, such as an Ethernet connection, for example, wired connection 133 connecting the personal computer 132 to the computer network 140. In other embodiments, the computing devices 120 may be connected to the computer network 140 via a wireless connection 136 in communication with wireless base station 134. In some embodiments, the wireless connection may include a mobile phone or cellular phone connection based on any of a number of mobile or cellular formats or protocols, including, for example, Global System for Mobile Communications (GSM), Code Division Multiple Access (CDMA), Universal Mobile Telecommunications System (UTMS0, Long Term Evolution (LTE), etc. In other embodiments, the wireless connection can include a WiFi or Bluetooth based connection and the base station can be a WiFi router or Bluetooth device, such as a Bluetooth radio, for receiving wireless transmissions from a computing device 120 or first VR device 130.

The immersive multimedia images and/or VR visualizations, together with any related files as described herein, may be transmitted to a provider server(s) 150 via computer network 140. The provider server(s) 150 may be associated with a provider of post-damage event activities or services, for example, an insurance company, a remedial service company, or a repair company. It is to be understood that, while the examples herein describe the provider as an insurance company, a remedial service company, or a repair company, the provider server(s) 150 may also be associated with other companies or individuals that may have an interest in providing services or activities related to the damage event, damage scene or damage item, and may benefit or otherwise use the systems and methods disclosed herein. The provider server(s) 150 may include any number of server computers, which can operate as a server farm, and can include one or more processors, one or more computer memories, and software or computer instructions for receiving immersive multimedia images and/or VR visualizations, and any related files, and for otherwise communicating with users, such as person 102, that submit the immersive multimedia images and/or VR visualizations, and any related files, to server(s) 150 as described herein. The immersive multimedia images and/or VR visualizations, and any related files, may be stored in the one or more memories of the server(s) 150, which can include one or more database(s) (not shown) associated with the server(s) 150. In some embodiments, the server(s) 150 and/or databases may be replicated and/or geographically distributed to provide disaster recovery and support functionality.

In some embodiments, the immersive multimedia images and/or VR visualizations may be annotated, for example, by person 102, and as further described herein, prior to transmission to the provider server(s) 150. In other embodiments, the immersive multimedia images and/or VR visualizations may be annotated after they are received at the provider server(s) 150. For example, in some embodiments, a second user at the provider server(s) 150, such as an employee or representative of the provider, can annotate the immersive multimedia images and/or VR visualizations submitted by a first user, such as person 102. In one example embodiment, the first user may annotate the immersive multimedia images and/or VR visualizations using a computing device 120 or first VR device 130. In another example embodiment, the second user can annotate the immersive multimedia images using an online application, which, in some embodiments, may be operable via server(s) 150 as a web page via a web browser on provider computing device 152. The provider computing device 152 can include a personal computer, such as a laptop or other computer with one or more processors and software or computer instructions that is connected to server 150 for accessing the immersive multimedia images and/or VR visualization, and related files, if any, via server(s) 150. In another embodiment, the second user can annotate the VR visualizations using the second VR device 154. The second VR device 154 can be the same or similar type of device as described for first VR device 130, such as a Google Cardboard VR device, such that the disclosure herein for first VR device 130 applies equally for second VR device 154.

In some embodiments, as described herein, the immersive multimedia images and/or VR visualizations may be supplemented with or otherwise enhanced with media or metadata, including information, graphics, video, or other immersive multimedia images or VR visualizations. In some embodiments, the media or metadata can include metadata from the provider, for example, via provider server(s) 150. For example, a provider can capture its own immersive multimedia images, VR visualizations, or information of a damages scene and store that information on provider server(s) 150. The provider's immersive multimedia images, VR visualizations, or information can then be used to supplement the immersive multimedia images, VR visualizations, or information submitted by the provider's customer or other user.

In other embodiments, the metadata may be sourced from third party resources, for example, third party server(s) 160, that collect and store metadata that may be useful to describe or enhance the immersive multimedia images, VR visualizations, or other information related to a damages scene or damaged item as describe herein. For example, third party server(s) 160 may represent a weather data service, such as the weather data service provided by the online National Weather Service (weather.gov), that may be accessed, for example, by a user or provider, to annotate immersive multimedia images and/or VR visualizations with weather data at the time and geographic location of the damage event. In another embodiment, the server(s) 160 may represent a map service, such as the Google Maps service (maps.google.com), that may be accessed, for example, by a user or provider, to annotate immersive multimedia images and/or VR visualizations with additional immersive multimedia images and/or VR visualizations, such as those provided by Google's Street View service associated with the Google Maps service. Additional examples of third party services for annotating immersive multimedia images and/or VR visualizations with metadata, content, or other information are described further herein.

Figure 2A:
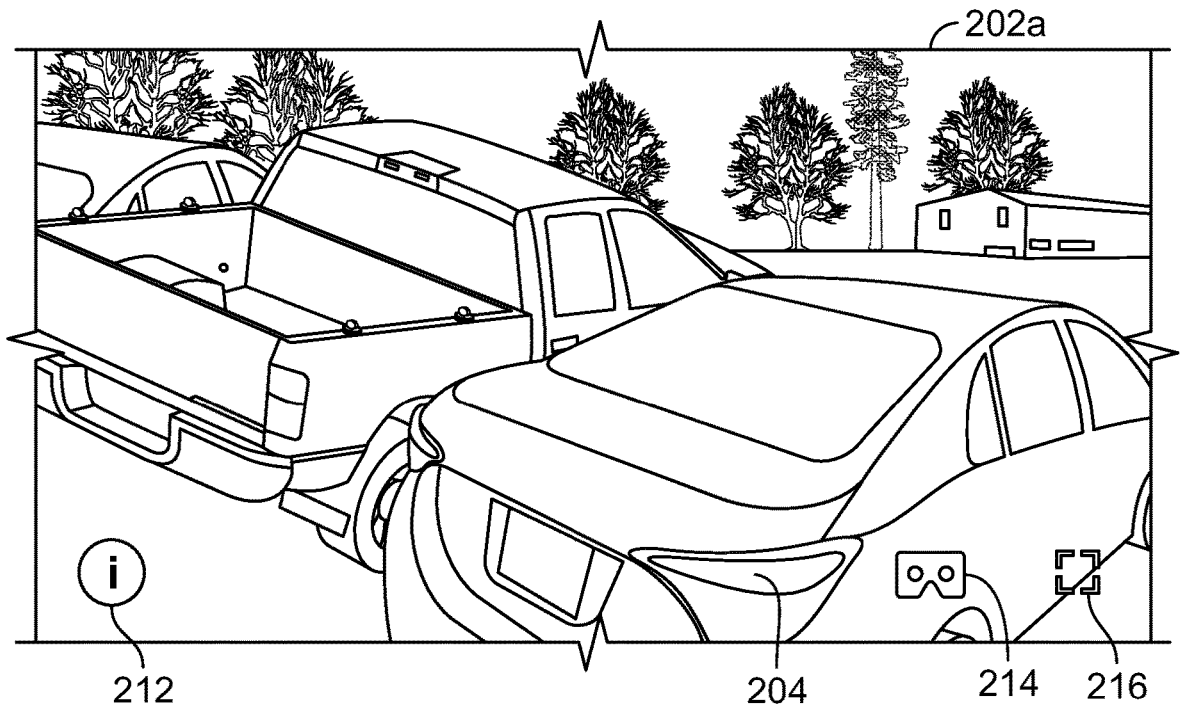
FIG. 2A illustrates an exemplary immersive multimedia image.

FIG. 2A illustrates an exemplary immersive multimedia image 202a. In some embodiments, the immersive multimedia image 202a depicted in FIG. 2A may represent a portion of, or depict a certain vantage point of, a complete immersive multimedia image, such as a panorama or 360-degree immersive multimedia image, that may be rotatable with a computing device 120 or VR device (e.g., first VR device 130) to see additional portions or vantage points of an environment or scene related to the immersive multimedia image 202a as described further herein. The exemplary embodiment of immersive multimedia image 202a depicts a damaged item, vehicle 204, that experienced a damage event, such as an automobile accident, in a damage scene, for example, a parking lot. The immersive multimedia image 202a may contain a complete 360 view of the parking lot, including entrances, exits, isles, and parking spot/parking space of the parking lot. As descried further herein, the various embodiments described for the immersive multimedia images and/or visualizations depicted for FIGS. 2A, 2B, 3A, 3B, 4, and 5A-5C relate to a parking lot damage scene embodiment, where a vehicle (i.e., the damaged item) has experienced a damage event, such as an automobile accident. It is to be understood, however, that the various descriptions and embodiments with respect to FIGS. 2A, 2B, 3A, 3B, 4, and 5A-5C may apply in the same or similar manner to other embodiments regarding other or different damage scene(s), damage event(s), damage item(s), etc.

In various embodiments, the immersive multimedia image 202a is capable of being viewed and/or manipulated via a computing device, such as any of a computing device 120, personal computer/laptop 132, and/or provider computing device 152 of FIG. 1. The computing device may have a software application or "App", such as an iOS-based App or Android-based App for a smart phone, such as smart phone 126, for displaying or allowing interaction with the immersive multimedia image 202a. In other embodiments, a computing device 120 may access an online application via a web browser, such as an online application associated with server(s) 150, for displaying or allowing interaction with the immersive multimedia image 202a.

In some embodiments, a user may annotate the immersive multimedia image 202a with metadata, as described herein, by selecting the annotation icon 212 using the interface of a computing device 120. Selection of the annotation icon 212 may cause a list, menu, or input box, or other input options to be displayed so that the user may input text, graphics, or other media or content for annotating or augmenting the immersive multimedia image 202a in accordance with the disclosures herein.

In other embodiments, a user may select full screen icon 216 to open a panorama or 360-degree immersive multimedia image in a full screen mode. Full screen mode can allow the user to rotate or change the view of the immersive multimedia image 202a on the user interface of the computing device so as to see different viewing angles or vantage points. For example, for the immersive multimedia image 202a, a user may rotate the view so as to view additional portions of the parking lot, or other damage scene characteristics, within the vicinity of vehicle 204. While in full screen mode, the user may annotate the immersive multimedia image 202a with text, graphics, or other annotations as described herein.

In other embodiments, a user may select VR icon 214 to launch or open virtual reality (VR) mode for immersive multimedia image 202a. The virtual reality mode may be used to visualize immersive multimedia image 202a as a VR visualization as further described herein. While in VR mode, the user may annotate the immersive multimedia image 202a with text, graphics, or other annotations as described herein.

Figure 2B:
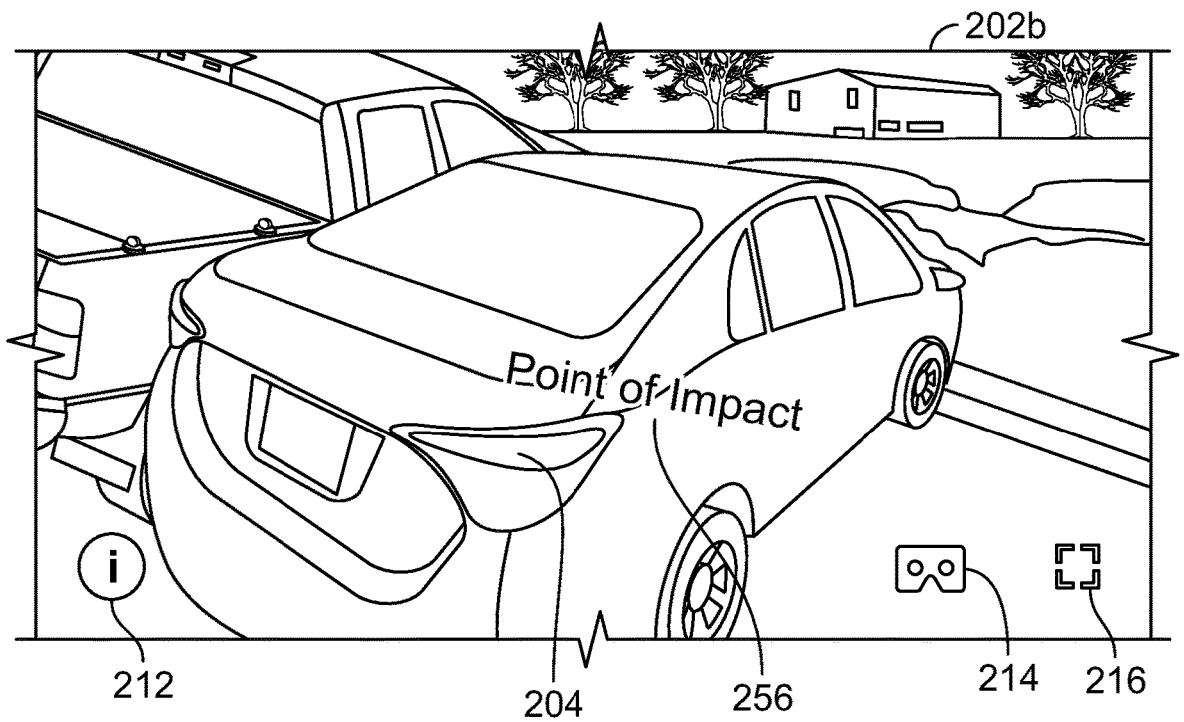
FIG. 2B illustrates an exemplary annotated immersive multimedia image version of the immersive multimedia image of FIG. 2A.

FIG. 2B illustrates an exemplary annotated immersive multimedia image 202b version of the immersive multimedia image 202a of FIG. 2A. For example, in some embodiments, as shown for FIG. 2B, the immersive multimedia image 202a may be annotated with text-based annotations, which may include tags or descriptors, to create annotated immersive multimedia image 202b.

The annotated immersive multimedia image 202b depicts a text-based annotation 256 ("point of impact") superimposed on top of the damaged item, vehicle 204, to indicate the point of impact, or damage, associated with the damaged vehicle 204, such as a damaged tail light. In some embodiments, the annotation may have be made by a user selecting annotation icon 212, selecting the location within the immersive multimedia image 202a to place the annotation (such as over the damage point on vehicle 204), and inputting the text "point of impact" on the damage point of vehicle 204.

In other embodiments, other annotations may indicate multiple points of impact or points of damage, such as to show the various locations on the damaged item, such as a vehicle 204, where damage to the damaged item has occurred. Still, in further embodiments, the annotation may indicate or associate a degree of damage per impact or location, such as an indication of the "main point of impact" or "main point of damage" to indicate the point on the vehicle or other damaged item that had the most severe damage compared with any other point associated with the damaged item.

In other embodiments, other annotations may be used to annotate immersive multimedia images, such as immersive multimedia image 202a. For example, in addition to text-based annotations, other sources of data, such as metadata or other information, may be used to annotate immersive multimedia images. The other sources of data, either individually, or with each other, can be superimposed, overlaid or otherwise associated with the immersive multimedia image(s) to augment the immersive multimedia image(s) to create annotated immersive multimedia images, such as the text-based annotated immersive multimedia image 202b. For example, annotated immersive multimedia image(s) can include any of a text-based annotation, a voice-based annotation, a graphical annotation, a video-based annotation, an augmented reality annotation, or a mixed reality annotation. In various embodiments, the data or other information may be added as metadata that can be part of an immersive multimedia image or as one or more separate files associated with the immersive multimedia image.

In some embodiments, the sources of data can include additional information or media provided by the user who originally captured the immersive multimedia images (e.g., represented by person 102 of FIG. 1), such as a witness to the damage event at the damage scene. In other embodiments, the sources of data can include additional information or media provided by a user who was not at the damage scene (e.g., also represented by person 102 of FIG. 1), such as a provider representative, who desires to annotate or capture immersive multimedia images used to provide post-damage services, such as a claims adjuster collecting evidence for claim, or a remedial or repair representative collecting damage information used to determine costs or activities to perform to repair related damaged items. Still further, in other embodiments, the sources of data can include media or information from third parties that may be accessible, for example, via third party server(s) 160, and then associated as metadata with the immersive multimedia images.

In one example embodiment, a voice-base annotation may be added to immersive multimedia image 202a. For example, a user may select annotation icon 212 and select a "voice" option from a menu that would cause the computing device (e.g., smart phone 126) to prompt the user for voice input. The user could then narrate, using a microphone associated with smart phone 126, his or her account of how damage occurred to vehicle 204 and could describe, for example, the point of impact annotation 204 in greater detail.

In another example embodiment, a graphical annotation may be added to the immersive multimedia image 202a. For example, a user may select annotation icon 212 and select a "graphical" option from a menu that would cause the computing device (e.g., smart phone 126) to prompt the user for graphical input. The user could then superimpose a graphic or graphical item onto the immersive multimedia image 202a to create a new annotated immersive multimedia image that included the graphic. In one example embodiment, the graphic could include a map image as sourced from Google Maps. For example, the user could retrieve a satellite image of the parking lot (e.g., the damage scene) from server(s) 160 where the damage event occurred. The user, selecting annotation icon 212, could choose to input the satellite image by overlaying the satellite image on top of the parking lot shown in the immersive multimedia image 202a in order to provide additional information, such as intersections, entrances, exits, nearby roads, etc. that may have not been captured originally in the immersive multimedia image 202a. In another embodiment, the user may choose to simply associate the satellite image with the immersive multimedia image as metadata, such that the satellite image may be accessed later by a link (not shown) displayed on the annotated version of the immersive multimedia image 202a so that the user, or a second user, may quickly access and see the intersections, entrances, exits, nearby roads as a satellite map. Still further, in other embodiments, the user may annotate the immersive multimedia image 202a with additional immersive multimedia image(s) such as additional immersive multimedia image(s) provided by Google's Street View service. In such an embodiment, the user, selecting annotation icon 212, could choose to annotate immersive multimedia image 202a with a Google Street View image by either overlaying or positioning the Google Street View image with the immersive multimedia image 202a, or by saving the Google Street View image as metadata (e.g., as an additional image for viewing by the selection of link), in order to provide additional information, such as intersections, entrances, exits, nearby roads, etc. of the damage scene parking lot that may have not been captured originally in the immersive multimedia image 202a.

In further embodiments, an immersive multimedia image, such as immersive multimedia image 202a, may be annotated by superimposing or associating a graphic, photograph, or other immersive multimedia image of a previous (non-damaged) version of a damaged item onto, or with, the currently damaged item as shown in the immersive multimedia image 202a. For example, a previous image of a non-damaged version of vehicle 204 may be superimposed with the damaged version of vehicle 204 so that a user can determine the extent of damage of the damaged item or determine how the item appeared before it was damaged. In another example embodiment, a previous image of non-damaged version of a basement of a household may be superimposed with the damaged version of the basement of the same household so that a user can determine the extent of damage or determine how the basement appeared before it was damaged. In other embodiments, the graphic or image may instead be associated with the immersive multimedia image (instead of superimposed on top of it), such that the user could view the previous version of the damaged item side-by-side, or in a similar manner, with the immersive multimedia image. In a similar embodiment, the user may view the damaged and non-damaged versions by selecting a link to display the previous version of the non-damaged item in a separate screen or window of the computing device than the immersive multimedia image that shows the damaged version. In some embodiments, the previous graphics or images may be actual graphics or images of the item before the item was damage. In other embodiments, the previous graphics or images may be graphics or images of the same or a similarly manufactured item that shows how the actual damage item would have appeared before it was damaged. The graphics or images can be sourced from the user who originally captured the immersive multimedia image or from a third party source, such as from third party server(s) 160. For example, photographs of the basement of the household that was damaged could be sourced from third party Zillow (zillow.com), which may contain photographs of the basement of the household before it was damaged, e.g., from when the household was up for sale prior to the damage event.

In other embodiments, other sources of data can include weather data, Global Positioning System (GPS) data, or any other data that can be associated and/or used to annotate immersive multimedia images. In certain embodiments, such data can be used as metadata to annotate the immersive multimedia images. For example, in certain embodiments, an immersive multimedia image, such as immersive multimedia image 202a, can be annotated to include weather data, such as the temperature, the humidity, the lighting conditions, or the road conditions (e.g., icy or wet). The metadata can also include the time of day of the damage event and the geographic location of the damage scene. In some embodiments, the weather related data may be accessed from third party sources, such as third party server(s) 160. For example, in certain embodiments, temperature, humidity, and/or road conditions (e.g., whether the road was icy or wet) for the time when the accident occurred can be accessed third party Waze (waze.com) or the National Weather Service (weather.gov), which can provide publically available data used to annotate the immersive multimedia image 202a.

In other embodiments, GPS data may also be used to annotate an immersive multimedia image, such as immersive multimedia image 202a. In such an embodiment, the GPS data could include a geographic location for the damage scene and/or timestamp when the damage event occurred. In other embodiments, a user may add geographic location information or timestamp information after the damage event occurred. In certain embodiments, the GPS data can be used to annotate the immersive multimedia image so that the GPS data is displayed on a screen, such as a screen of a computing device 120, with the immersive multimedia image 202a. In other embodiments, a user may have to select a link to view or otherwise show the GPS data.

Other metadata may include information provided by witnesses, such as the driver of the vehicle, or other individuals associated with the damages scene. In one embodiment, for example, such witness-based metadata may include whether a driver was able to see a stop sign that was in the vicinity of the damage scene. In another embodiment, for example, the content of other witnesses, such as witnesses who posted descriptions, static photographs, or videos of the damage event or damage scene on social media platforms (e.g., such as Facebook), may be accessed and added to or used to annotate immersive multimedia images.

In still a further embodiment, police records, including witness statements taken by police officers that witnessed the damage scene or that were present at the damage scene after the damage event may be used to annotate the immersive multimedia images. The police records may be recallable by a link provided with a viewing application of the computing device displaying the immersive multimedia image.

In other embodiments, public or private images or data associated with the damage scene may be used to annotate immersive multimedia images, such as immersive multimedia image 202a. In the example embodiment for immersive multimedia image 202a, the parking lot operator may store or track parking data, such as when a vehicle entered the parking lot or when the vehicle exited parking lot, how long a vehicle remained in the parking lot, etc. Such data may be stored in third party server(s) 160. Such parking lot information could be accessed and used to annotate the immersive multimedia image 202a, tracking when the damaged vehicle, or a vehicle that caused the damage to the damaged vehicle, entered the parking lot, etc.

In another embodiment, video data or images from live video cameras (e.g., public or private cameras) may also be stored, e.g., in server(s) 160, and can be used to annotate immersive multimedia images. In the example embodiment, for immersive multimedia image 202a, the parking lot operator may operate one or more of video cameras, which may capture images of the damage event at the damage scene. In another embodiment, video images of a dashboard or other camera device associated a moving vehicle, such as a police vehicle patrolling the parking lot, may also be captured and stored in server(s) 160. In one embodiment, the video images could be accessed via server(s) 160 and used to annotate the immersive multimedia image 202a, depicting how the damaged vehicle, or a vehicle that caused the damage to the damaged vehicle, entered the parking lot, caused the damage, etc.

In a further embodiment, various types of data and/or images may be used to recreate the motion or a simulated video of a damage event for visualization purposes. In one example embodiment for immersive multimedia image 202a, an automobile accident may be recreated based on vehicular telematics data collected for the vehicle, for example, such as a computing device associated with the vehicle that collects the speed of the vehicle at a particular time, if and when the vehicle's airbags were deployed, whether the vehicle, or other vehicle that caused the accident, was being operated at or below the speed limit, etc. The vehicular telematics data may be used together with any of the video images, map information, other immersive multimedia images, such as immersive multimedia images from the Google Street View service, dashboard camera views, witness statements, and/or weather data, lighting data, as described herein, to reconstruct and annotate one or more immersive multimedia images in order to simulate and visualize the damage event as it would have happened at the time of the actual crash and within the damage scene. In some embodiments, depending on the data available, areas, such as roads, intersections, or areas of the parking lot, just before where the vehicle entered the damage scene may also be used to create or annotate immersive multimedia images for visualization purposes as described herein.

Figure 3A:
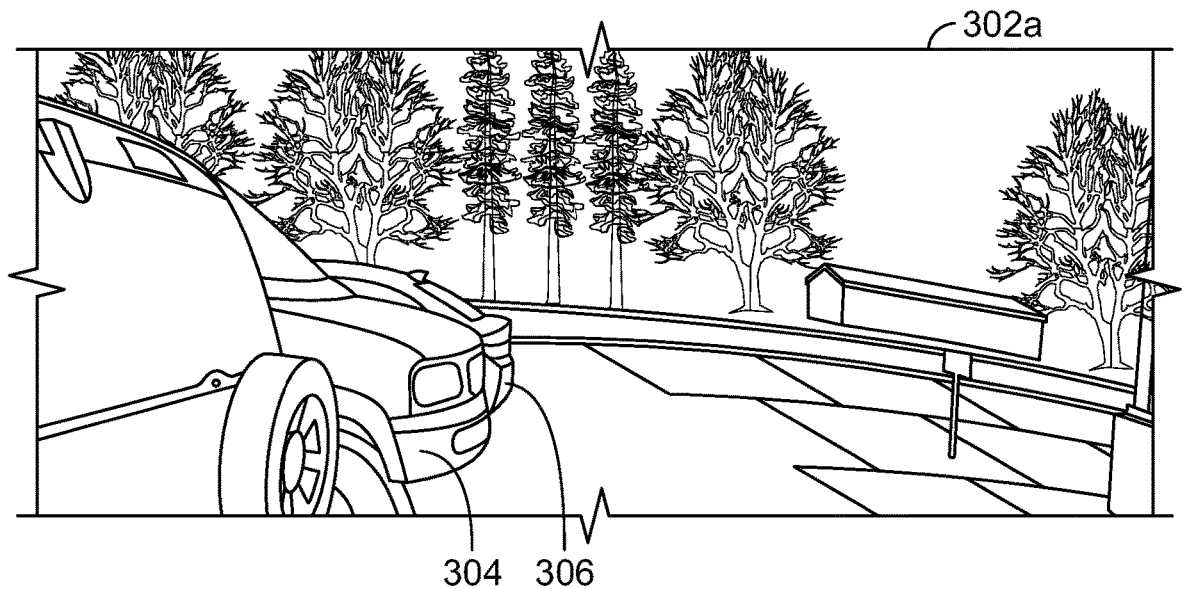
FIG. 3A illustrates an exemplary immersive multimedia image associated with an exemplary damages scene.

FIG. 3A illustrates an exemplary immersive multimedia image 302a associated with an exemplary damages scene, which, in the embodiment shown for immersive multimedia image 302a, is a parking lot associated with automobile accident. For example, the immersive multimedia image 302a may be associated with the parking lot damage scene as described herein for FIGS. 2A and 2B. In one embodiment, for example, immersive multimedia image 302a can be the same immersive multimedia image as immersive multimedia image 202a, but is represented at a different viewing angle or vantage point within the image where a user, using a computing device 120 and selecting full screen icon 216, rotated or otherwise changed the view of the immersive multimedia image 202a to depict the view as shown in immersive multimedia image 302a. The multimedia image 302a may show a particular isle or lane of the parking lot with parked vehicles 304 and 306 on the left side of the lane.

Figure 3B:
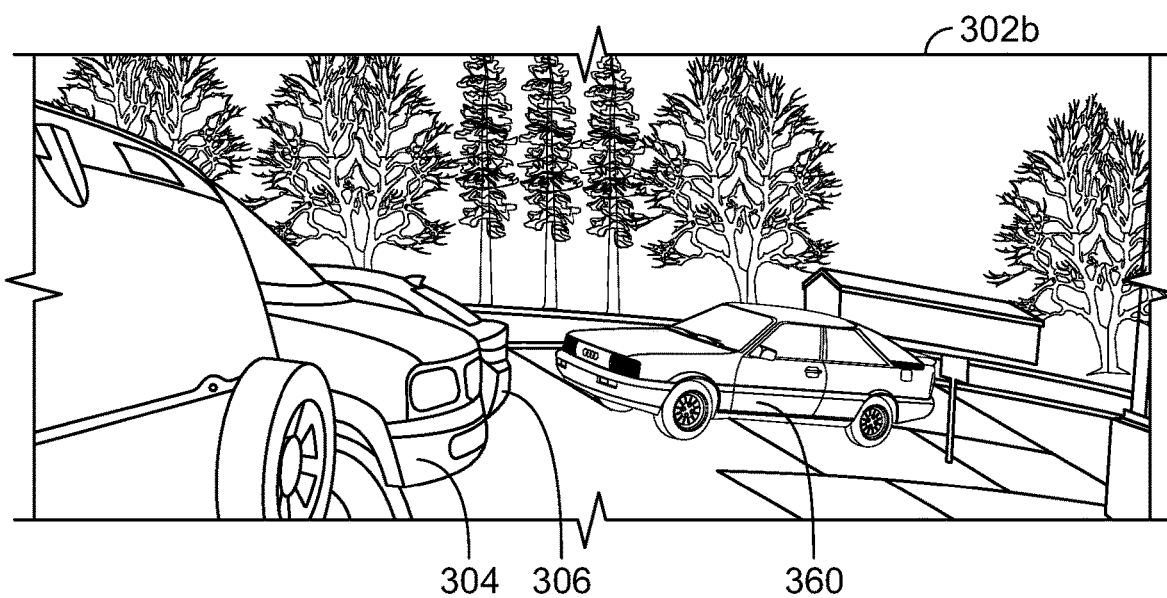
FIG. 3B illustrates an exemplary augmented-reality annotation or mixed-reality annotation immersive multimedia image version of the immersive multimedia image of FIG. 3A.

FIG. 3B illustrates an exemplary augmented-reality annotation or mixed-reality annotation immersive multimedia image 302b version of the immersive multimedia image 302a of FIG. 3A. In the example embodiment for annotated immersive multimedia image 302b, a computer graphic or image of a vehicle, augmented vehicle 360, is added to the immersive multimedia image 302a. In certain embodiments, the augmented vehicle 360 could represent the vehicle that caused the accident (i.e., the damage event) or the vehicle that was damaged (i.e., the damaged item) of the damage scene (i.e., the parking lot). In certain embodiments, the augmented vehicle 360 could be positioned in the immersive multimedia image 302a based on witness statements, or other information, describing or showing one or more locations of the augmented vehicle 360 at a particular time before or during the damage event, to create the augmented or mixed reality annotated immersive multimedia image 302b. For example, in the embodiment of immersive multimedia image 302b, the augmented vehicle 360 could represent the vehicle that caused the accident, where the vehicle was turning at a wide angle into the parking lane, or that the vehicle was improperly driving through empty parking lot spaces, or that the vehicle was speeding in the parking lot. In other embodiments, the immersive multimedia image 302b may further be annotated with additional augmented vehicles to show the location of additional parked cars in the parking lot.

In another embodiment, an immersive multimedia image of a household interior (not shown) may be augmented to show a stove or fireplace from which a fire that caused damage supposedly started. The fire could have destroyed the stove or fireplace such as to make the stove or fireplace unrecognizable within the immersive multimedia image depicting the related damage scene. The augmented stove or fireplace may be positioned within the immersive multimedia image of the household interior to create an augmented or mixed reality annotated immersive multimedia image version showing where the stove or fireplace was prior to the fire damage event. In either case, the augmented or mixed reality annotations would be viewable in VR visualizations of the respective immersive multimedia images as described herein.

FIG. 4 illustrates exemplary virtual reality (VR) visualization 402 of the immersive multimedia image 202b of FIG. 2B. For example, text-based annotations 406 and 408 ("point of impact" annotations) correspond to text-based annotation 256 of multimedia image 202b of FIG. 2B. In some embodiments, the VR visualization 402 may be displayed on a screen associated with a VR device, such as first VR device 130 or 154. The screen may be the screen of smart phone 126 that is housed in a VR device, such as first VR device 130 or second VR device 154, such as the Google Cardboard device. In other embodiments, the screen, or in some cases multiple screens are built into the VR device, such as first VR device 130 or second VR device 154, such as the two screens of an Oculus Rift device. Selecting arrow 404 will take the user back to the previous screen, such as multimedia image 202b of FIG. 2B.

The VR visualization 402 depicts a VR rendering of the immersive multimedia image 202b. In the example embodiment, VR visualization 402 includes a pair of VR viewports (416 and 418) displayed side by side, one for each eye. Each of the VR viewports 416 and 418 can include annotations of the immersive multimedia image on which the viewports are based, which, for immersive multimedia image 202b, includes the text-based "point of impact" annotation for the damaged vehicle 204. The VR device, such as first VR device 130 or second VR device 154, contains a set of lenses that focus a user's eyes on, and that reshape each of the VR viewports for each eye, thereby creating a stereoscopic 3D image that gives the user the sensation that he or she is in a virtual reality environment, such as the parking lot damages scene for the embodiment of VR visualization 402. The gear icon 414 can be selected to access a setting menu for calibrating or adjusting the settings the VR visualization 402.

In various embodiments, a VR visualization can be rendered in a VR device, such as VR devices 130 and 154 of FIG. 1, based as the immersive multimedia images loaded into the respective VR device. In some embodiments, one or more VR visualizations may be generated as files that may be loaded into the VR device. For example, the VR visualization(s) files can be generated by a separate computing device, such as a different computing device 120, a VR device, personal computer, or server, and stored within a database, such as a database associated with server(s) 150. In such an embodiment, the stored VR visualization(s) files can be accessed by and loaded in the VR device for visualization. In other embodiments, the immersive multimedia images may be loaded into the Random Access Memory (RAM) for rendering respective VR visualizations without first creating a file. In such an embodiment, the VR visualization may be generated dynamically by the one or more processors of, or associated with, the VR device and displayed to the user.

In some embodiments, the VR visualization(s) can be generated before they are transmitted over a computer network, such as computer network 140. In such embodiments, the VR visualization may be created by a computing device 120, the first VR device 130 or the personal computer/laptop 132. In other embodiments, the VR visualization(s) are generated based on immersive multimedia images that were transmitted via computer network 140. For example, in one embodiment, a first user, such as person 102, may transmit annotated or non-annotated immersive multimedia images to provider server(s) 150, where a second user, such as a representative of the provider associated with provider server(s) 150, may generate VR visualization(s) based on the first user's annotated or non-annotated immersive multimedia images using provider computing device 152 or second VR device 154.

Figure 5C:
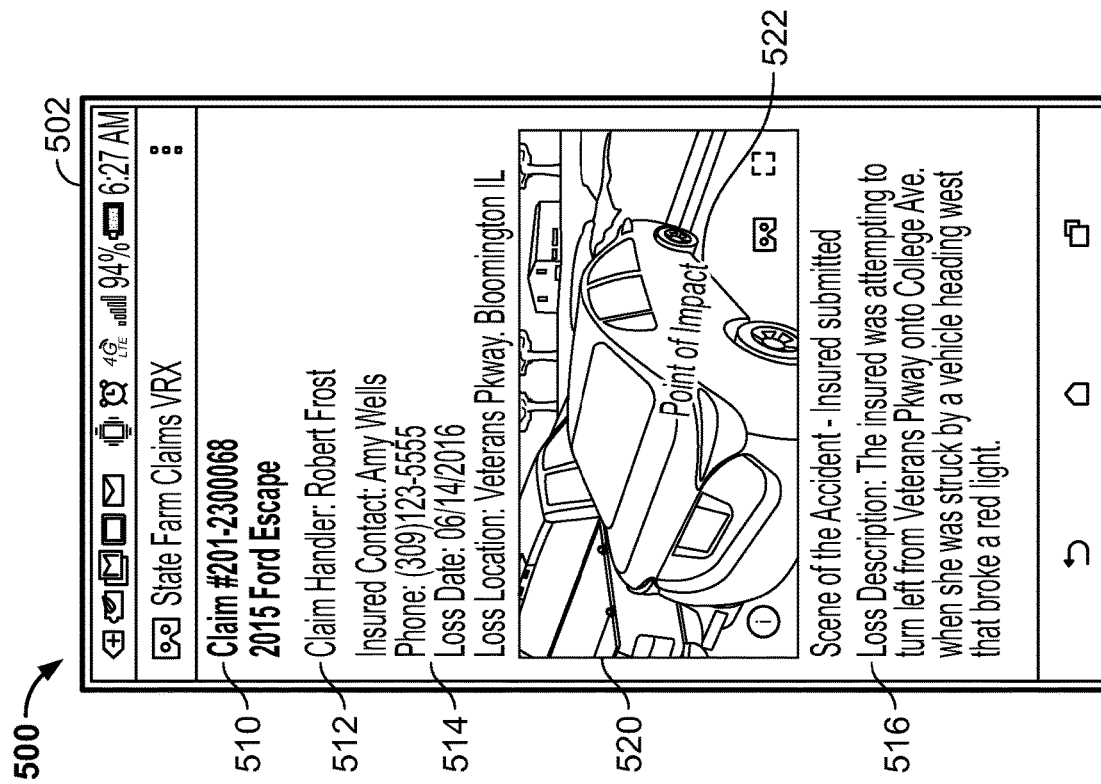
FIG. 5C illustrates the exemplary user interface of the computing device of FIG. 5B depicting an exemplary annotated version of the immersive multimedia image associated with the damages scene of FIG. 5B.

FIG. 5A illustrates an exemplary user interface 500 of a computing device for associating an immersive multimedia image with a damages scene. In one embodiment, for example, the computing device may be smart phone 126, which includes a Claims App 502 for displaying user interface 500. In some embodiments, the Claims App 502 may be implemented as software or computer instructions, such as Java code on the Google Android platform, or as Objective-C or Swift code on the Apple iOS platform. In the example embodiment of FIGS. 5A-5C, a user, such as an insured customer of an insurance company, can file an insurance claim, and related annotated multimedia images, to the insurance company regarding damage that the user's vehicle experienced in a parking lot. For example, the user's vehicle may be vehicle 204 from FIGS. 2A and 2B, such that, as described herein, the user (e.g., person 102 of FIG. 1) can capture immersive multimedia images for the damaged vehicle 204, annotate the immersive multimedia images for the damaged vehicle 204, and submit the immersive multimedia images for the damaged vehicle 204 to the insurance company's servers, such as server(s) 150. For example, using Claims App 502, the user may file an insurance claim 510 which may be assigned a related claims number (e.g., "#201-2300068) and that may identify the type of vehicle that was damaged (e.g., a "2015 Ford Escape"). The claim may also be assigned a particular insurance representative to handle the claim, such as a claims handler or claims adjuster 512 (e.g., "Robert Frost"). The information submitted by the user may also include additional information (514) including the user's information and other information related to the damage event, which can include the insured user's contact name (e.g., "Amy Wells"), a phone number by which the user may be contacted (e.g., "(309)123-5555"), the date that the damage event occurred (e.g., the "Loss Date: Jun. 14, 2016"), a location of the damage scene (e.g., the "Loss Location: Veterans Pkway. Bloomington Ill."), and an indication of where the information was submitted from and who submitted the information (e.g., "Scene of the Accident—Insured submitted"). Information that includes a description of damage event (516) may also be submitted using the Claims App 502, where the user can submit detail of the damage event and damage scene (e.g., "The insured was attempting to turn left from Veterans Pkwy on to College Ave. when she was struck by a vehicle heading west that broke a red light.").

In some embodiments, the information 510-516 may be stored or may otherwise be separate from any immersive multimedia images submitted by the user. In other embodiments, the information 510-516 may be used to augment or annotate the any immersive multimedia images submitted by the user, such as with metadata or otherwise as described herein.

As shown in the embodiment of FIG. 5A, the user may also use the Claims App 502 to add and submit one or more immersive multimedia images. For example, the damages scene can be captured via immersive multimedia images, including one or more immersive multimedia photographs and/or immersive multimedia videos. The user may then add the immersive multimedia images to the Claims App 502 by selecting an input option (504), such as "Add 360 Photo" from a menu displayed by the Claims App 502. In some embodiments, the immersive multimedia images may be stored in one or more memories of the computing device that that the Claims App is operating. In other embodiments, the immersive multimedia images may be transmitted to remote server for storage, such as the insurance company's provider server(s) 150.

FIG. 5B illustrates the exemplary user interface 500 of the computing device of FIG. 5A depicting an immersive multimedia image 518 associated with a damages scene. In the example embodiment, the immersive multimedia image 518 represents the parking lot damage scene associated with the damages claim filed by the user as described for FIG. 5A. In the present embodiment, the immersive multimedia image 518 has been added to the user interface 500 of the Claims App 502. The immersive multimedia image 518 is operable to be annotated using, for example, the icons displayed immersive multimedia image 518, which operate in the same or similar manner as describe for FIGS. 2A and 2B. In addition, a user may select an input option (506), such as "Annotate Photo" from a menu displayed by the Claims App 500, which can open the immersive multimedia image in a full screen view or a VR visualization view for annotation as describe herein. As describe herein, the user may add annotations to the immersive multimedia images to highlight certain points of interest.

The annotations may be made by the user before or after the immersive multimedia images are submitted. In one embodiment, for example, a user may first submit a non-annotated immersive multimedia image to provider server(s) 150. Once the immersive multimedia image has been submitted, the user may use the Claims App 502, which may be in communication with the provider server(s) 150 via computer network 140, to annotate the remote immersive multimedia images by accessing the Claims App 502 and specifying the annotations to add and positions of the annotations within the remote immersive multimedia images. In another embodiment, the user may annotate the immersive multimedia image using the Claims App 502 prior to submitting the immersive multimedia images to server(s) 150. For example, the user may annotate the immersive multimedia images as described for FIGS. 2A and 2B herein. In a further embodiment, the user may annotate a first set of one or more immersive multimedia images prior to submitting the first set to server(s) 150 and may submit a second set of immersive multimedia images with no annotations. The user may then access the server(s) 150 to update the first or second set of immersive multimedia images with additional or new annotations.

In some embodiments, the Claims App 502 may provide a user may with a selectable list of one or more annotations, where a selection of a particular annotation from the list causes the immersive multimedia image to be augmented with the particular selected annotation. For example, in some aspects, a predetermined checklist of common or typical identifiable annotations associated with a particular damage event may be provided to the user for selection. Such annotations can include, for example, "point of impact" for a vehicular accident damage event or "source of fire" for a household damage event. The predetermined checklist can assist the user in describing the damage scene with commonly used terms by a third party servicer, such as an insurance company or repair or remedial service.

In a similar embodiment, the Claims App 502 may provide story options to select from. Such story options can include common or readily recognizable annotations associated with particular damages events or damage scenes. For example, for an automobile accident, the story options can include annotations such as "main point of damage on vehicle," "front of vehicle," "side of vehicle," used for annotating a vehicle depicted in immersive multimedia image. Other annotations for the automobile based story mode can relate to the damage scene, including, for example, "intersection of crash event," "other vehicle involved in crash," "location of crash event," or other annotations that describe the scene or environment of the crash event. As another example, for a household damage event, the story options can include annotations such as "fire damage area," "area of likely cause of fire damage start," "water damage area," "area of likely cause of water damage start," or other annotations that describe the scene or environment associated with the household or property damage event.

In other embodiments, the Claims App 502 may provide an option for the user to authenticate or otherwise verify the submitted immersive multimedia image(s), and any of the annotated information provided with the immersive multimedia images. The verification can include a verification indicator, such as a checkbox, or signature box, provided via the Claims App 502 that the user, or other witness, can indicate, authenticate or otherwise verify the accuracy of the immersive multimedia images, annotations or related information.

FIG. 5C illustrates the exemplary user interface 500 of the computing device of FIG. 5B depicting an exemplary annotated version 520 of the immersive multimedia image 518 associated with the damages scene of FIG. 5B. For example, annotated immersive multimedia image 520 may represent the same or different view immersive multimedia image 518. A different view could include a rotated view or different vantage point of immersive multimedia image 518. In the example embodiment of FIG. 5C, the annotated immersive multimedia image 520 depicts the damaged vehicle 204, as shown in FIGS. 2A and 2B, where the user has annotated the immersive multimedia image 518 with the text-based annotation "Point of Impact" to create the annotated immersive multimedia image 520 that shows where the damage occurred to the vehicle.

In some embodiments, once an annotation is made to the immersive multimedia image, the claim including related information (e.g., 510-516), and including all images and immersive multimedia image(s), whether annotated or not, may be submitted to the related insurance company. In another embodiment, the claim related information, the immersive multimedia image(s), and/or annotations may each be submitted separately, such as overtime (e.g., immediately after the damage event or at some time thereafter) as more detail is discovered for the damage event and/or damage scene.

Figure 6:
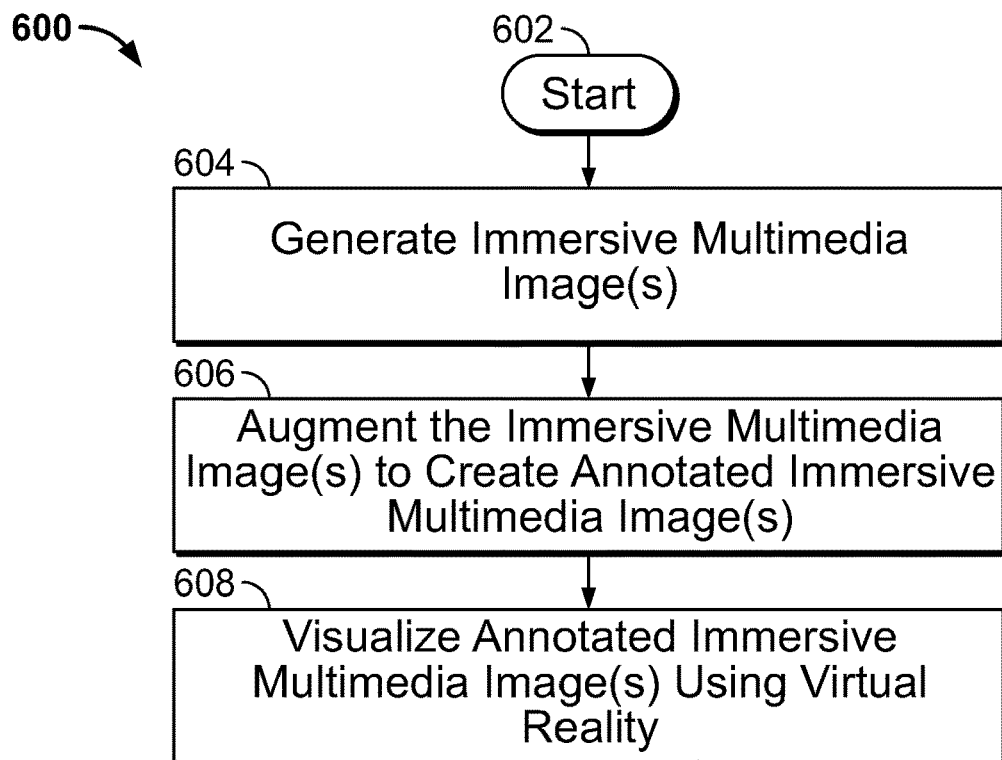
FIG. 6 illustrates a flow diagram of an exemplary method for annotating and visualizing a damage scene.

FIG. 6 illustrates a flow diagram of an exemplary method for annotating and visualizing a damage scene. The method begins (602) where a computing device, such as a computing device 120 of person 102 from FIG. 1, generates immersive multimedia image(s) (block 604). The immersive multimedia image(s) may be associated with a damage scene, such as a damages scene related to a vehicular accident or a property damage event. The immersive multimedia image(s) can include any of 360-degree photographs, panoramic photographs, 360-degree videos and/or panoramic videos as described herein. In some embodiments, the immersive multimedia image(s) may be created from multiple non-360-degree or non-panoramic photographs or videos. The immersive multimedia image(s) may be saved as computer files, such as JPEG, PNG, or MPEG files.

At block 606, the immersive multimedia image(s) may be augmented with annotation(s) to create annotated immersive multimedia image(s). In various embodiments, the annotation(s) can include any of a text-based annotation (e.g., indicating a "point of impact" or "point of interest" text-based annotation), a voice-based annotation, a graphical annotation, a video-based annotation, an augmented reality annotation, or a mixed reality annotation. The augmented or mixed reality annotations can include, for example, superimposed images or graphics to add additional detail to the original immersive multimedia image(s). For example, the damages scene may be annotated with an augmented reality annotation or a mixed reality annotation that describes the damages scene at or near a time when the related damage event occurred in order to enhance the damage scene for visualization purposes as described herein. The annotation information can come from various or multiple sources, including the person who originally captured the immersive multimedia image(s), or from third party sources, such as Google, Waze, Zillow, or other sources as described herein.

In some embodiments, a user can select from a display listing of preexisting annotations, that can include any of the text-based, graphic-based, video based, augmented reality-based or mixed reality-based or other annotations described herein, and that may be used to augment immersive multimedia images to create annotated immersive multimedia images.

In some embodiments, the annotated immersive multimedia image(s) may be annotated with metadata, which, for example, can include GPS information (e.g., that can provide the location of the damage event or scene, the location where a vehicle was located before or at the time of the damage event, or the location of a user when capturing an immersive multimedia image), a time stamp for when the damage occurred, humidity, temperature, or road conditions. In some embodiments, the metadata may also include pictures that were posted by other users or witnesses on social media platforms such as Facebook or pictures from other third party sources, such as pictures of properties posted on Zillow. In other embodiments, the metadata may also include information about the damages scene, such as whether there was area an intersection or whether there was stop sign that was viewable or hidden from view. In still further embodiments, the metadata may include telematics data captured from one or more vehicles involved in a crash. For example, the telematics data may be used in certain embodiments to create a simulation video of the damage scene based on the telematics data and one or more immersive multimedia image(s) that depict the damage scene. For example, in one embodiment, the telematics may be used together with map images from Google Maps or immersive multimedia image(s) from Google Street View to map a sequence of pre-crash events (e.g., whether a vehicle was turning into a parking lot or lane), and then using the pre-crash sequence can depict the crash route to recreate the damage event. Other data, including GPS data (such as timestamp data), road conditions, witness statements, etc. may be used to further enhance the accuracy of the recreated damage event.

At block 608, the annotated immersive multimedia image(s) may then be visualized using a virtual reality (VR) device, such as first VR device 130 or 154 of FIG. 1, where the damage scene and the annotation(s) of the annotated immersive multimedia image(s) can be viewed via the VR device. In some embodiments, the generation of immersive multimedia image(s) can occur at or near the damage scene, but the visualization of the immersive multimedia image(s) can occur at a location remote to the damage scene using a virtual reality (VR) device. For example, person 102 can capture the immersive multimedia image(s) and may transmit the immersive multimedia image(s) to provider server(s) 150 where a provider representative may visualize the immersive multimedia image(s) in second VR device 154.

In some embodiments, the damage scene of an immersive multimedia image can depict a damaged item, such as vehicle 204 for FIG. 2A, having a point of impact annotation associated with the damaged item. In the example embodiment, a prior image of the damaged item can be overlaid on or displayed together with at the immersive multimedia image in order to show the extent of damage of the damaged item, for example, how the item looked before it was damaged and how it looked after it was damaged.

Figure 7:
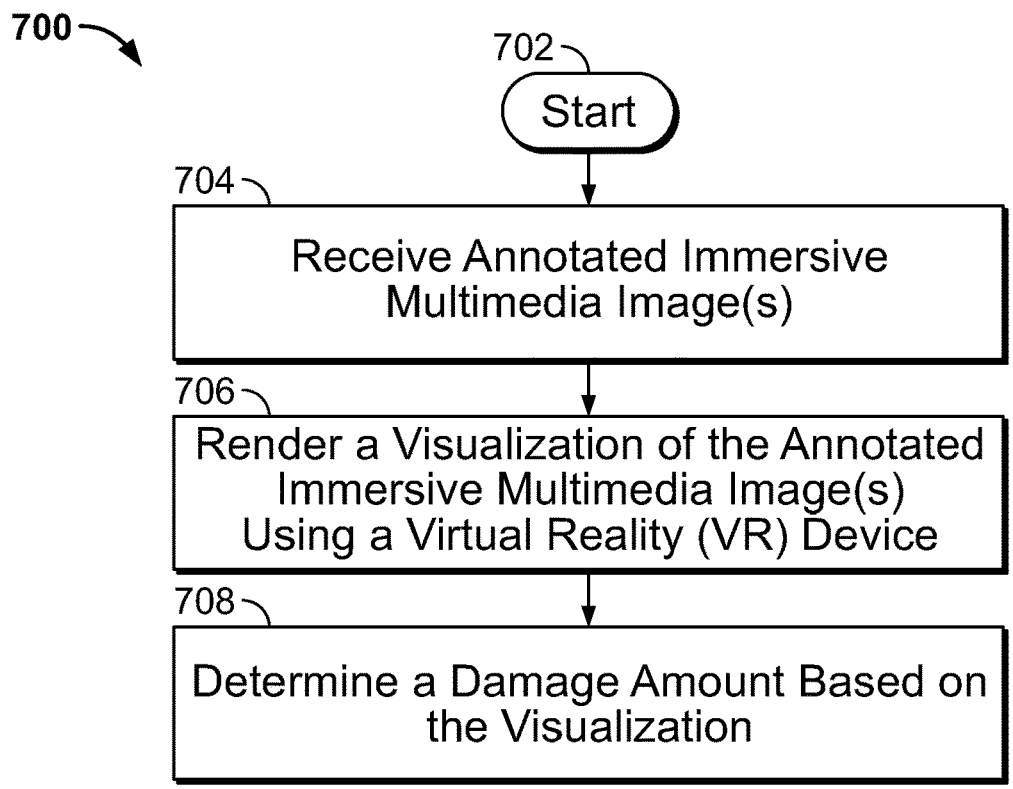
FIG. 7 illustrates a flow diagram of an exemplary method for enhancing and developing a damage scene visualization.

FIG. 7 illustrates a flow diagram of an exemplary method for enhancing and developing a damage scene visualization. The method may begin (702) where one or more processors, such as one or more processors of provider server(s) 150, receive annotated immersive multimedia image(s) from a first user (block 704). In some embodiments, the annotated immersive multimedia image(s) can be associated with a damage scene. For example, the first user may be an individual involved in a damage event at a damage scene, and associated with a damaged item, such as an insurance customer involved in an automobile accident and associated with a damaged vehicle. The first user may capture immersive multimedia image(s) as described herein and submit the annotated immersive multimedia images to a third party, for example, via computer network 140. For example, the third party may be an insurance provider or remedial services provider associated with post-event activities. In one embodiment, for example, the annotated immersive multimedia images may be received and used by remedial services provider, such as an automobile repair service or a fire damage restoration service, to determine what products, services, tools or other assets are needed to repair the damaged item. Based on the same or similar analysis, the remedial services provider may also be able to determine a damages amount associated with repairing or replacing the damaged item or items.

In another embodiment, the immersive multimedia images may be sent to an insurance company or insurance representative, such a claims adjuster, for determining a damages amount and/or for adjusting a claim based on the information provided by the annotated immersive multimedia images, or visualizations thereof, as described herein. In other embodiments, the immersive multimedia images may be used to train new insurance representatives. For example, a claims adjuster can be trained using past or current immersive multimedia images, and/or the visualization systems and methods as described herein, to determine the damages amount or to otherwise adjust past or current insurance claims based on existing or current immersive multimedia images.

At block 706 the annotated immersive multimedia image(s) may be used to render a visualization using a VR device, such as second VR device 154, associated with a second user. In some embodiments, the second user can be a provider representative, such as a claims adjuster or insurance claims trainee of an insurance provider, or a remedial or repair services representative of a repair or remedial company associated with repairing damaged items related to the damage scene. In some embodiments, the second user, including a provider representative, such as a claims adjuster or handler, can visualize the immersive multimedia images using a virtual reality (VR) device, such as second VR device 154, and related VR application. For example, the second user can initiate the VR application to analyze, annotate or otherwise review the immersive multimedia images in virtual reality mode. Where the provider representative is using Google Cardboard, for example, the VR device would include the Google Cardboard housing and a compatible interface device, for example, a compatible smart phone, such as a Google Android based phone or an Apple iOS based phone. The second user would then have full a full 360-degree virtual reality view of the damage scene to analyze and inspect related details with enhanced clarity that virtual reality provides. For example, the second user would be able to see the relationship of objects to one another and could get a more detailed perspective on the damage scene, causes of the damage, etc. In some embodiments, annotations that were made by the first user, second user, or other person could be displayed in the virtual reality visualization to create an augmented reality experience. For example, in some embodiments, the annotations could appear as the user's view moved over an area in the visualization that was annotated. In various embodiments, the annotations could include any of one or more text-based annotations, voice-based annotations, graphic-based annotations, an augmented reality annotation, and/or a mixed reality annotations, as described herein.

In some embodiments, the second user may enhance the annotated immersive multimedia image(s) provided by the first user, where the annotated immersive multimedia image(s) provided by the first user are augmented by the second user with additional annotation(s). In some embodiments, the additional annotation(s) can be transmitted from the first user via a computer network to the second user. In some embodiments, each of the annotated immersive multimedia images can include timestamp value(s) that can indicate when the annotated immersive multimedia image(s) were generated, received, stored, etc.

In one example embodiment, the enhanced immersive multimedia image can be a mixed reality immersive multimedia image, where an annotation, such as a graphical annotation, is used to generate the mixed reality immersive multimedia image by augmenting the annotated immersive multimedia image(s) of the first user with the graphical annotation.

In some embodiments, a verification indication may be received from the first user, where the verification indication indicates that the enhanced immersive multimedia image represents an interpretation of the damage scene as determined by the first user.

At block 708, the VR visualization may be used to determine a damage amount, where the damage amount is determined from one or more damaged items identifiable in the annotated immersive multimedia images. In some embodiments, the damaged items identifiable in the VR visualization can have predetermined values. In various aspects, the predetermined values of multiple damaged items may be used to calculate a sum total damage amount. In some embodiments, the damage amount may be modified, for example, by a claims adjuster of an insurance company associated with a damages claim associated with the damaged item.

In some embodiments, the annotated immersive multimedia images from the first user may be stored by a computing device, such as server(s) 150, at an initial time and may be accessed, for example, by second VR device 154, to render a VR visualization at a later time.

In some embodiments, the augmented immersive multimedia image(s) of the first user are capable of being displayed on a web browser as corresponding two dimensional (2D) image(s) via an online application. For example, the web browser could be operated by the second user on provider computing device 152 where the online application runs on the provider server(s) 150 as a client-server based online application implemented, for example, in Java Server Pages (JSP), Microsoft .Net Active Server Pages (ASP), Ruby on Rails, etc. For example, the second user can review immersive multimedia images using the online application, where the annotated immersive multimedia images can be dragged and rotated around on the screen of provider computing device 152 to see the entire damage scene, or the screen of a provider tablet device (not shown) or provider mobile device (not shown).

In still a further embodiment, a second user, such as the third party insurance representative or repair representative may request additional immersive multimedia images from a first user, such as the individual who took a first set of immersive multimedia images. For example, a claims adjuster reviewing a claim and related immersive multimedia images submitted by an insurance customer regarding household damage may request that the insurance customer provide additional immersive multimedia images so that the claims adjuster can better visualize, or have more information, for visualizing the damage scene in the claims adjuster's VR device. In such an embodiment, the claim's adjuster may interact with the customer, for example, ask additional questions and get more feedback from the customer that can be used to further annotate the immersive multimedia images. For example, the claims adjuster could annotate the customer's submitted immersive multimedia images on behalf of the customer as the customer and the claim's adjuster communicate via a phone connection.

In another embodiment, the first user and the second user may simultaneously visualize the enhanced immersive multimedia image on respective first and second VR devices. For example, both a claims adjuster and an insurance customer may simultaneously visualize the customer's submitted immersive multimedia images via respective VR devices. For example, the claim's adjuster could visualize an immersive multimedia image via second VR device 154 of FIG. 1 and the customer could visualize the same immersive multimedia image via first VR device 130 of FIG. 1, where the visualization information would be sent from either the customer to the claims adjuster, or vice versa, over computer network 140 of FIG. 1 In this way, both the customer and the claim's adjuster would be able to view, annotate, or otherwise interact with the same immersive multimedia image at the same time. In some embodiments, the first user and the second user may be at remote locations.

In other embodiments, the claim's adjuster could assist the customer select annotation options from a menu or list to annotate and further enhance the information provided by the VR visualization as describe herein. For example, a selectable list of annotation(s) may be provided to the first user, where selection of a particular annotation from the list of annotation(s) by the first user causes the enhanced immersive multimedia image to be augmented with the particular annotation.

ADDITIONAL CONSIDERATIONS

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. One may be implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A visualization system configured to annotate and visualize a damage scene, the visualization system comprising:
   a damage scene visualization application (app) configured to execute on a virtual reality (VR) device of a user, the VR device comprising one or more processors, the damage scene visualization app executing on the one or more processors to:
   generate one or more immersive multimedia images associated with a damage scene, each of the one or more immersive multimedia images captured at or near a location of a damage event and comprising multiple viewing angles of a vantage point defining the damage scene;
   augment at least one of the one or more immersive multimedia images with an annotation to create at least one annotated immersive multimedia image, the annotation identifying one or more damage positions associated with one or more damaged items within the damage scene; and
   visualize the at least one annotated immersive multimedia image using the VR device, wherein the damage scene and the annotation of the at least one annotated immersive multimedia image are capable of being viewed via the VR device.

2. The visualization system of claim 1, wherein the one or more immersive multimedia images are any of the following: one or more 360-degree photographs, one or more panoramic photographs, one or more 360-degree videos, one or more panoramic videos, or one or more photographs or videos for creating an immersive multimedia image.

3. The visualization system of claim 1, wherein the damage scene is associated with at least one of the following: a vehicular accident or a property damage event.

4. The visualization system of claim 1, wherein the annotation is one or more of the following: a text-based annotation, a voice-based annotation, a graphical annotation, a video-based annotation, an augmented reality annotation, or a mixed reality annotation.

5. The visualization system of claim 4, wherein the damage scene includes at least one augmented-reality annotation or at least one mixed-reality annotation that visualizes the damage scene at or near a time when damage associated with the damage scene occurred.

6. The visualization system of claim 1, wherein the damage scene includes at least one damaged item, and wherein the annotation is a point of impact annotation associated with the damaged item within the damage scene, and wherein a prior image of the damaged item is capable of being overlaid on or displayed together with at least one of the one or more immersive multimedia images associated with the damage scene.

7. The visualization system of claim 1, the damage scene visualization app further configured to create a simulation video of the damage scene based on a plurality of the one or more immersive multimedia images.

8. The visualization system of claim 1, the damage scene visualization app further configured to associate metadata with the at least one annotated immersive multimedia image.

9. The visualization system of claim 1, the damage scene visualization app further configured to display a listing of one or more annotations, each of the one or more annotations in the listing capable of being selected for augmenting the one or more immersive multimedia images.

10. The visualization system of claim 1, wherein the visualization of the at least one annotated immersive multimedia image using the VR device occurs at a location remote to the damage scene.

11. A computer-implemented visualization method for annotating and visualizing a damage scene using one or more processors, the method comprising:
   generating, by a damage scene visualization application (app) configured to execute on a virtual reality (VR) device of a user, one or more immersive multimedia images associated with a damage scene, each of the one or more immersive multimedia images captured at or near a location of a damage event and comprising multiple viewing angles of a vantage point defining the damage scene;
   augmenting at least one of the one or more immersive multimedia images with an annotation to create at least one annotated immersive multimedia image, the annotation identifying one or more damage positions associated with one or more damaged items within the damage scene; and
   visualizing the at least one annotated immersive multimedia image using the VR device, wherein the damage scene and the annotation of the at least one annotated immersive multimedia image are capable of being viewed via the VR device.

12. The computer-implemented visualization method of claim 11, wherein the damage scene is associated with at least one of the following: a vehicular accident or a property damage event.

13. The computer-implemented visualization method of claim 11, wherein the annotation is one or more of the following: a text-based annotation, a voice-based annotation, a graphical annotation, a video-based annotation, an augmented reality annotation, or a mixed reality annotation.

14. The computer-implemented visualization method of claim 13, wherein the damage scene includes at least one augmented-reality annotation or at least one mixed-reality annotation that visualizes the damage scene at or near a time when damage associated with the damage scene occurred.

15. The computer-implemented visualization method of claim 11, wherein the damage scene includes at least one damaged item, and wherein the annotation is a point of impact annotation associated with the damaged item within the damage scene, and wherein a prior image of the damaged item is capable of being overlaid on or displayed together with at least one of the one or more immersive multimedia images associated with the damage scene.

16. The computer-implemented visualization method of claim 11, further comprising creating a simulation video of the damage scene based on a plurality of the one or more immersive multimedia images.

17. The computer-implemented visualization method of claim 11, further comprising associating metadata with the at least one annotated immersive multimedia image.

18. The computer-implemented visualization method of claim 11, further comprising displaying a listing of one or more annotations, each of the one or more annotations in the listing capable of being selected for augmenting the one or more immersive multimedia images.

19. The computer-implemented visualization method of claim 11, wherein the visualization of the at least one annotated immersive multimedia image using a virtual reality (VR) device occurs at a location remote to the damage scene.

20. A tangible, non-transitory computer-readable medium storing instructions for annotating and visualizing a damage scene that, when executed by one or more processors of a virtual reality (VR) device of a user, cause the one or more processors of the VR device to:

generate one or more immersive multimedia images associated with a damage scene, each of the one or more immersive multimedia images captured at or near a location of a damage event and comprising multiple viewing angles of a vantage point defining the damage scene;

augment at least one of the one or more immersive multimedia images with an annotation to create at least one annotated immersive multimedia image, the annotation identifying one or more damage positions associated with one or more damaged items within the damage scene; and visualize the at least one annotated immersive multimedia image using the VR device, wherein the damage scene and the annotation of the at least one annotated immersive multimedia image are capable of being viewed via the VR device.

\* \* \* \* \*